United States Patent
Demtchouk

[19]

[11] Patent Number: 6,135,546
[45] Date of Patent: Oct. 24, 2000

[54] TABLE ASSEMBLY FOR A MOTOR VEHICLE SEAT

[75] Inventor: Maria Demtchouk, Ostfildern, Germany

[73] Assignee: Peter Rainer Nöller, Ostfildern, Germany

[21] Appl. No.: 09/331,654

[22] PCT Filed: Oct. 24, 1998

[86] PCT No.: PCT/DE98/03127

§ 371 Date: Jun. 23, 1999

§ 102(e) Date: Jun. 23, 1999

[87] PCT Pub. No.: WO99/21732

PCT Pub. Date: May 6, 1999

[30] Foreign Application Priority Data

Oct. 24, 1997 [DE] Germany ............ 197 47 081

[51] Int. Cl.[7] ................................. A47B 39/00
[52] U.S. Cl. .................. 297/135; 224/275; 108/44
[58] Field of Search ................. 297/135, 217.1, 297/188.2; 108/44, 50.11, 157.11; 224/275

[56] References Cited

U.S. PATENT DOCUMENTS

| | | |
|---|---|---|
| 4,512,503 | 4/1985 | Gioso . |
| 4,795,210 | 1/1989 | Milat . |
| 4,813,751 | 3/1989 | Fenn . |
| 4,832,241 | 5/1989 | Radcliffe . |
| 4,909,159 | 3/1990 | Gonsoulin . |
| 4,942,827 | 7/1990 | Norgaard . |
| 5,505,139 | 4/1996 | Storholm et al. . |
| 5,628,439 | 5/1997 | O'Hara . |
| 5,667,272 | 9/1997 | Sutton . |

FOREIGN PATENT DOCUMENTS

| | | |
|---|---|---|
| 91 13 078 6 | 4/1993 | Germany . |
| 94 17 823 | 3/1995 | Germany . |
| 295 09 240 | 10/1995 | Germany . |
| 196 44 802 | 4/1998 | Germany . |
| 2 262 511 | 6/1993 | United Kingdom . |

*Primary Examiner*—Milton Nelson, Jr.
*Attorney, Agent, or Firm*—Venable; George H. Spencer; Robert Kinberg

[57] ABSTRACT

A table device (3) for the passenger seat (2) of a motor vehicle has a belt as a fastening device, which is to be placed around the backrest. In addition, a receiving means is provided for a segment of the three-point belt. In terms of the travel direction of the vehicle, the receiving means is disposed behind the center of gravity of the table device, which effectively prevents a tilting of the table device around a lateral axis during intense braking maneuvers.

21 Claims, 2 Drawing Sheets

6,135,546

TABLE ASSEMBLY FOR A MOTOR VEHICLE SEAT

BACKGROUND OF INVENTION

The invention relates to a table device for placing on a motor vehicle seat, in particular the passenger seat of a passenger vehicle, wherein the table is used as a desk and/or computer table.

People whose professions require them to be on the road a lot in their cars increasingly use portable computers whose performance capabilities have recently increased considerably. A multitude of potential uses arise from this. Portable computers can assume increasingly greater parts of office organization so that client lists, address lists, telephone number lists, materials lists, order lists, and the like can easily be retrieved at any time. These data are also of interest during a car trip. Furthermore, with the availability of CD ROM drives in portable computers, road maps can also be retrieved, which can significantly facilitate the navigation of the car driver involved.

Furthermore, peripheral modules for portable computers have become known, which permit the reception of GPS signals and consequently permit a very precise position determination using the GPS system. These peripheral modules include receivers for simultaneously receiving a number of satellite signals by means of which the position determination is carried out. If a portable computer includes such GPS modules, in the event that it is used during travel, it must be positioned so that it can receive the satellite signals. Furthermore, the screen must be conveniently visible by the driver so that his attention to the traffic situation is interfered with as little as possible.

For traffic safety reasons, portable computers in motor vehicles must be supported so that to the greatest extent possible, there are no uncontrolled movements of the portable computer or other items used by the driver during travel, even in the event of intense braking or other driving situations that are connected with greater accelerations or decelerations.

Devices for supporting items on the passenger seat are known from the prior art. For example, German Patent Document No. DE 9417823 U1 has disclosed a device for on-board service of motor vehicles. This has a so-called safety box which has a number of compartments that are open at the top. On its underside, the safety box is provided with a balancing base, which is adapted to the seat contour. Primarily the seatbelt is used to fasten the safety box to the passenger seat. This is embodied as a three-point belt and consequently has a section provided for the upper body of a passenger and a section provided for his pelvis. Both sections are guided around the front side of the safety box in order to press it against the backrest of the passenger seat. In order to secure the safety box to the seat surface, lateral tension belts are provided, which engage with hooks under the sides of the passenger seat.

In terms of the travel direction of the vehicle, the safety belt engages the safety box in front of its center of gravity. With full braking actions or intense braking maneuvers, the safety box can therefore develop a tilting moment. If the safety box thus lifts up for the seat surface and tilts slightly, items disposed in it can slip out toward the front.

Therefore, the known safety box is not provided or suitable for carrying a relatively sensitive portable computer.

The seat provided with the safety box must usually be slid into a rear position because the extension length of the safety belt is limited. This can impair the accessibility of the safety box.

SUMMARY OF THE INVENTION

An object of the invention is to produce a table device for a motor vehicle, which can be used as a desk and computer table.

This object is attained with a table device having a base frame, to the top of which a flat and essentially smooth table top is secured. This is embodied on top of a base frame and is consequently considerably higher than the seat surface of the passenger seat. It preferably occupies the entire top of the base frame and protrudes beyond it at the edge. The height of the base frame is preferably dimensioned so that a portable computer disposed on the table top is held with its screen approximately at the level of the dashboard. It is therefore possible to place the computer in or at least close to the driver's field of view so that a glance at the screen of the computer distracts the driver as little as possible.

The table device has connecting means that are independent of the three-point belt and are for securing the table device to the backrest as well as receiving means for receiving the lap segment of the three-point belt. The securing to the backrest by a fastening means that is independent of the safety belt achieves the fact that in the event of an intense deceleration of the vehicle, no moments can occur that tend to tilt the table device forward. The center of gravity of the table device is in front of the back rest and consequently, in terms of the travel direction, lies in front of the connecting means that connect the base frame to the backrest. These connecting means preferably engage the side of the base frame oriented toward the backrest.

In addition, the table device uses a single segment of the three-point belt, namely the segment provided for securing the pelvis of a passenger, for the purpose of pressing the base frame of the table device onto the seat surface. Correspondingly receiving means for the appropriate segment of the three-point belt are preferably disposed on the end of the base frame oriented toward the backrest. The other segment provided for securing the upper body of a passenger rests unused against the backrest of the seat. The extension length of the belt is therefore minimal, which means that the seat carrying the table device can be slid into its furthest forward position without the belt limiting this movement. As a result, the computer resting on the table top can be brought very close to the dashboard. This permits not only a convenient viewing of the screen, but also permits a placement in a position that is particularly well suited to the reception of satellite signals (GPS signals).

In addition, this achieves a favorable use of space on the interior of the passenger vehicle. If the passenger seat is slid all the way forward or at least far forward, there is a lot of room in the back for luggage.

Furthermore, the table device is very easy to mount on the seat of a motor vehicle. This is particularly true because the three-point belt does not have to be stretched around the table device, but only has to be guided along the backrest. In this connection, it turns out to be advantageous that the upper belt provided for securing the upper body of a passenger does not prevent access to the table device from the passenger door.

Advantageously, the lap section of the three-point belt, in terms of the travel direction, engages the table device behind its center of gravity. If, for example, the connecting means which secures the table device to the backrest were to be not completely tight or were to give, or if the backrest itself were to give slightly, the lap section of the belt can assume part of the securing function without the table device tilting forward.

If the receiving means for the lap section of the three-point belt is embodied by means of hooks that are open toward the top, the three-point belt can be fastened in a particularly simple manner.

The connecting means for fastening the table device to the passenger seat or its backrest is preferably a belt which is equipped with a buckle that is easy to operate. This buckle is connected behind the backrest. The belt is preferably inelastic, which produces a secure fastening of the table device even if a certain degree of play remains.

For the sake of safety, another connecting means can be provided, which secures the front side of the table device to the passenger seat. This connecting means can, for example, be embodied by simple elastic belts, which have hooks on the end. These are guided under the front edge of the seat and are fastened there. They are, in fact, largely without function during braking and acceleration, but secure the table device to the seat surface, which can be important, particularly on a bumpy road surface.

The disposition of additional connecting means on the front side of the table device has the advantage that the distance to the fastening points under the seat does not become too great. These are usually disposed at or in the vicinity of the front seat edge.

In an advantageous embodiment, the table top protrudes forward in terms of the travel direction, beyond both the base frame and the seat surface. As a result, a portable computer can then be placed particularly close to the dashboard and the windshield. This is advantageous due to the ergonomic placement and due to the reception requirements for satellite signals. Suitable securing means, for example socket pins to be slid into openings in the table top, can be provided to secure the computer in place. A particularly favorable securing effect is achieved when the table top is additionally provided so that is is inclined slightly toward the backrest. In the event of an intense braking action, the socket pins prevent the portable computer form slipping forward toward the dashboard. The upward slope toward the dashboard furthermore causes the computer to be pressed against the table top. Consequently, no tilting moment is produced which could lift the computer up from the table top and hurl it against the dashboard. This is particularly true with regard to braking maneuvers that can lead the vehicle to tilt forward. The inclination of the table top toward the backrest is preferably greater than the greatest forward inclination of the vehicle to be assumed (taking into account downhill travel and braking action).

Other electronic devices can be placed underneath the table top, for example a printer or other tools.

Other advantageous details of embodiments of the invention are the subject of dependent claims and can be inferred from the drawing as well as from the accompanying description. An exemplary embodiment of the invention is depicted in the drawings.

DETAILED DESCRIPTION OF THE PREFERRED EMBODIMENTS

Figure 1:
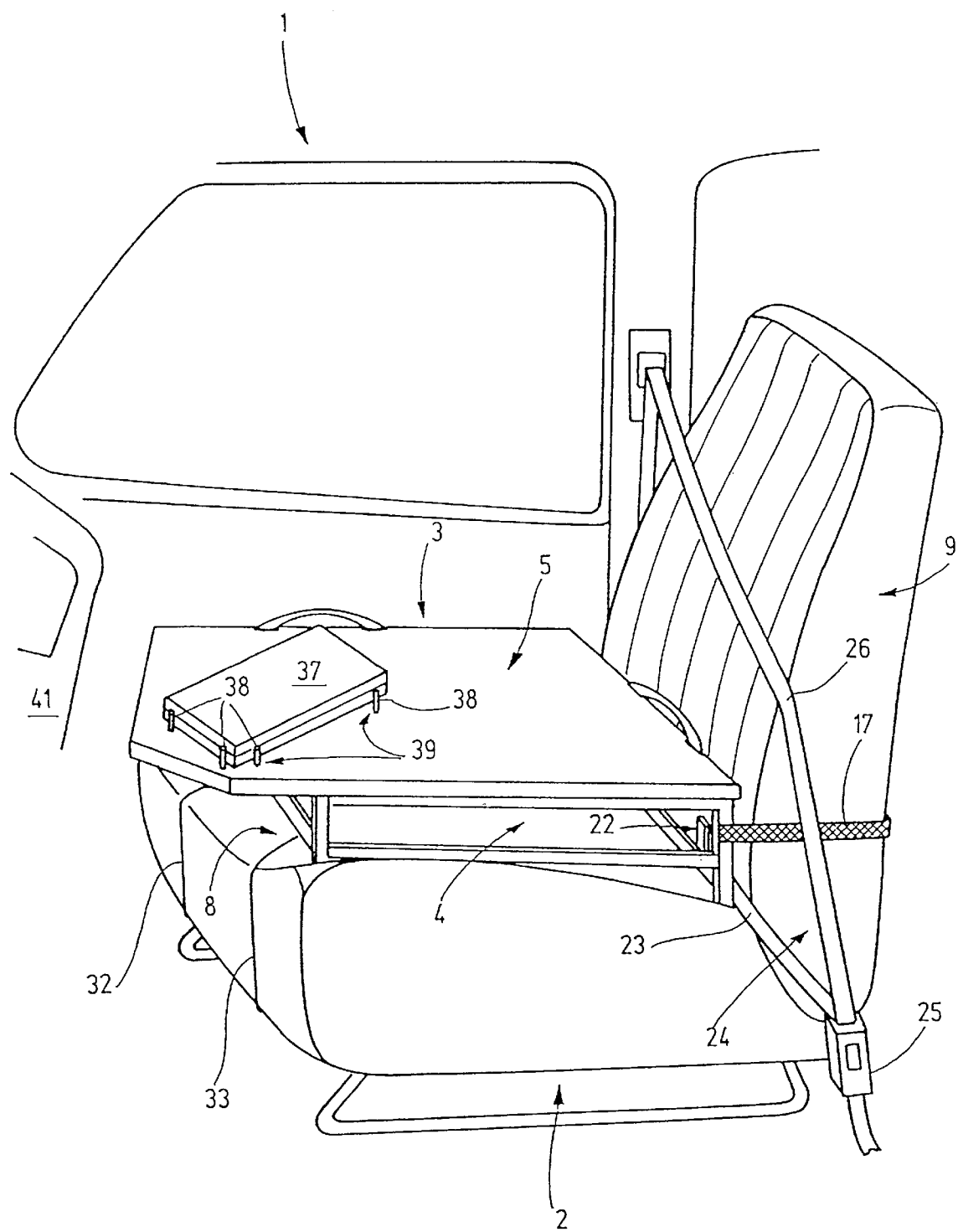
FIG. 1 is a schematic, perspective depiction of a passenger seat of a motor vehicle, with a table device according to the invention positioned on it.
Figure 2:
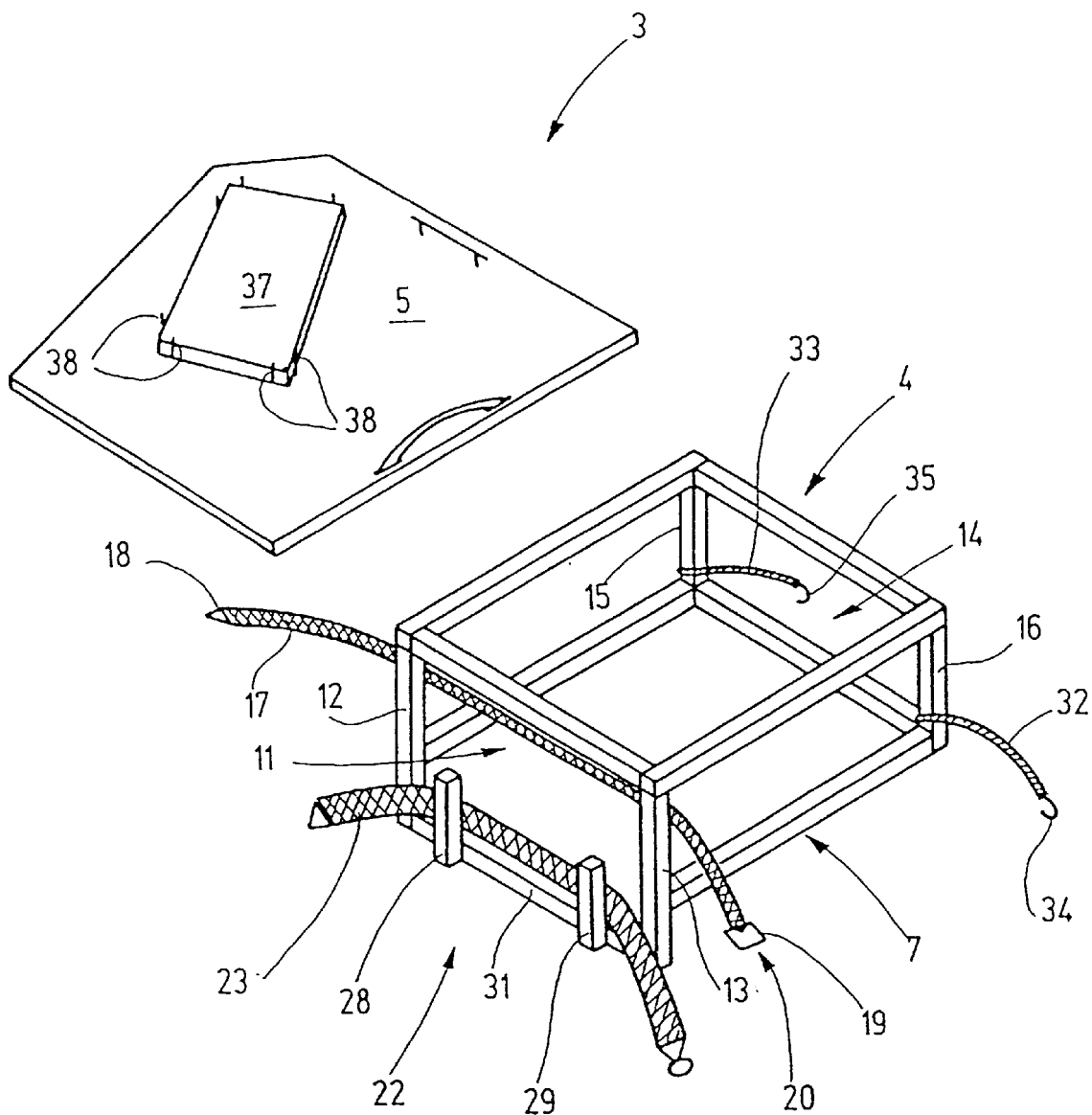
FIG. 2 is a schematic, exploded depiction of the table device according to FIG. 1, from another perspective.

In an extremely schematic and only partial manner, FIG. 1 indicates a vehicle 1 on the inside of which a passenger seat 2 is provided with a table device 3 disposed on it. The table device 3 is essentially comprised of a base frame 4 and a table top 5 secured to it. The base frame 4, which can be seen for example in FIG. 2, is embodied for example by means of a frame made of profiled material sections. It is essentially block-shaped. Its underside 7 is oriented toward a seat surface 8 embodied on the passenger seat 2 and rests on this surface. In order to compensate for the inclination of the seat surface 8, the base frame 4, on its side 11 oriented toward the backrest 9 of the passenger seat 2, has struts 12, 13, which extend in the vertical direction beyond the underside of the base frame 4. The lower end faces of the struts 12, 13 have support surfaces for the seat surface 8. Corresponding struts 15, 16 disposed on a front side 14 of the base frame 4 correspond in length to the height of the base frame 4 and are therefore shorter than the struts 12, 13.

On the whole, the base frame 4 is embodied in such a way that the table top 5 has a slope toward the backrest 9. The slope corresponds to an inclination angle that is greater than the inclination angle that conventional passenger vehicles have during intense braking. The inclination angle of the table top 5 is finally dimensioned so that the table top 5 still has a slight inclination toward the rear, i.e. toward the backrest 9, even during full braking.

The base frame 5 is provided on its back side 11 with a belt 17 whose ends 18, 19 can be connected to each other by means of a buckle 20. This is connected behind the backrest 9 of the passenger seat 2 and secures the base frame 4 to the backrest 9. The belt 17 consequently constitutes a connecting or fastening means for the table device 3.

In order to further fix the table device 3, the base frame 4 is provided with a receiving means 22 for a segment 23 of a three-point belt 24 provided in the vehicle 1 and associated with the passenger seat 2. The segment 23 of the three-point belt 24 extends from a bottom securing point, over the seat, to a catch or belt fastening device 25 disposed on the other side next to the seat. Another segment 26 of the three-point belt 24 is designated for securing the upper body of a passenger. When the three-point belt 24 is used to secure the table device 3, this upper segment 26 rests without function against the backrest 9.

The receiving means is constituted by two sections 28, 29 that extend upward like hooks, which the segment 23 can engage behind. They extend protruding freely upward in a vertical direction from a lower cross-rail 31 of the base frame 4. Due to the open construction of the base frame 4, the segment 23 of the three-point belt 24 can be easily laid against the sections 28, 29.

For additionally fastening the table device 3 to the seat surface 8, other connecting means, such as rubber bands 32, 33, can be provided on the front side 14 of the base frame 4. These bands are each connected with one end to the base frame 4. On their free end, they are provided with a hook 34, 35, which can be fastened to openings or rails underneath the passenger seat 2.

The base frame 4 is designed with a view to customary and normal seat surface inclinations and vehicle inclinations during intense braking so that the table top 5 connected to the base frame 4 is held with a slope that rises at least slightly toward the front both during travel and during an intense braking maneuver. As a result, items stored on the table top 5, such as a laptop or a notebook 37, are prevented from being hurled off. This laptop or notebook is additionally held in place by securing means. These means can, for example, be constituted by socket pins 38 that are slid into corresponding openings 39 of the table top 5. Two socket pins 38 are respectively disposed at a corner of the notebook 37, wherein a certain degree of play can easily be provided in order to adapt to different types and sizes.

The table top 5 protrudes forward beyond both the base frame 4 and the passenger seat 2 so that during operation, the portable computer or laptop 37 can be placed and held close to a dashboard 41 provide din the vehicle 1, approximately at the level of this dashboard. Its keyboard and its screen are thus disposed in or near the driver's field of view. The position is additionally favorable for receiving GPS signals.

The table device 3 described thus far is used as follows:

In order to fasten it to a passenger seat, the table device 3 is first place don the seat surface 8. The three-point belt 24 is pulled out and the segment 23 is placed over the sections 28, 29 of the base frame 4, whereupon the three-point belt 24 is secured to the belt catch 25. In order to fasten the table device 3 to the passenger seat 2, it is now necessary to connect the belt 17, which takes place behind the backrest 9. If need be, the hooks 34, 35 can also be fastened under the passenger seat 2. Finally, the position of the passenger seat is set so that the table top 5 is close to the dashboard 41. The table device 3 is now completely mounted. In order to secure the laptop 37, the socket pins 38 can also be inserted into the openings 39.

A table device 3 for the passenger seat 2 of a vehicle 1 has a belt 17 as a fastening device, which is to be placed around the backrest 9. In addition, a receiving means 22 for a segment 23 of the three-point belt 24 is provided. In terms of the travel direction of the vehicle, the receiving means 22 is disposed behind the center of gravity of the table device 3, which effectively prevents a tilting of the table device 3 around a lateral axis in the event of intense braking maneuvers.

What is claimed is:

1. A table device for a motor vehicle seat having a seat surface and a backrest, the seat having a three-point belt associated therewith, the table device comprising:
    a base frame having an underside for placement on the seat surface of the seat, and a top;
    a table top connected to the base frame and disposed on the top of the base frame, the table top having a front side;
    connecting means for connecting the base frame of the table device to the backrest of the seat; and
    receiving means provide don the base for receiving only one segment of the three-point belt, which is stretched along the backrest, wherein the receiving means comprises hooks that are open toward the top.

2. A table device for a motor vehicle seat having a seat surface and a backrest, the seat having a three-point belt associated therewith, the table device comprising:
    a base frame having an underside for placement on the seat surface of the seat, and a top;
    a table top connected to the base frame and disposed on the top of the base frame;
    connecting means for connecting the base frame of the table device to the backrest of the seat; and
    receiving means provided on the base frame for receiving only one segment of the three-point belt, which is stretched along the backrest, wherein the table top is a one piece table top.

3. A table device for a motor vehicle seat having a seat surface and a backrest, the seat having a three-point belt associated therewith, the table device comprising:
    a base frame having an underside for placement on the seat surface of the seat, and a front side;
    a table top connected to the base frame and disposed on the top of the base frame;
    connecting means for connecting the base frame of the table device to the backrest of the seat; and
    receiving means provided on the base frame for receiving only one segment of the three-point belt, which is stretched along the backrest, wherein the table top protrudes past the front side of the base frame.

4. The table device according to claim 3, wherein the base frame has a back side adapted to be oriented toward the backrest on which the receiving means is disposed.

5. The table device according to claim 3, wherein the table device has a back part, and the receiving means prevents at least the back part of the table device, which is adapted to be oriented toward the backrest, from moving vertically upward.

6. The table device according to claim 3, wherein the receiving means is disposed behind the center of gravity of the table device.

7. The table device according to claim 3, wherein the receiving means is adapted to receive a segment of the three-point belt that serves as a lap belt.

8. The table device according to claim 3, wherein the table top is detachable.

9. The table device according to claim 3, wherein the base frame connects to the table top so that the table top is inclined toward the backrest when the table device is mounted in the motor vehicle.

10. The table device according to claim 3, wherein the base frame has a receiving compartment for an electronic device located underneath the table top.

11. The table device according to claim 3, wherein the seat surface has a front edge and the table top (5) is adapted to protrude past the front edge of the seat surface.

12. The table device according to claim 3, characterized in that the receiving means has receiving spaces on at least one side, into which the segment of the three-point belt is receivable.

13. The table device according to claim 12, wherein the receiving spaces are open towards the top.

14. The table device according to claim 3, wherein the connecting means for fastening the table device to the backrest is a belt.

15. The table device according to claim 14, wherein the belt has a connecting device to be connected behind the backrest.

16. The table device according to claim 14, wherein the belt is inelastic.

17. The table device according to claim 3, wherein the table top has securing means for securing items placed on the table top.

18. The table device according to claim 17, wherein the table top has openings provided therein and the securing means comprises socket pins that can be inserted into the openings provided in the table top.

19. The table device according to claim 3, wherein the base frame has an additional connecting means for connecting the seat to the base frame.

20. The table device according to claim 19, wherein the additional connecting means has at least one elastic tension means which has a first end connected to the base frame and a remote end having a hook.

21. The table device according to claim 20, wherein the table device has a front side and the tension means is disposed so that the hook can be guided under the front side of the seat and fastened under the front side of the seat.

* * * * *